United States Patent
Dork et al.

[15] 3,652,328
[45] Mar. 28, 1972

[54] TRANSPARENT PLASTIC HAVING TRANSPARENT MAR-RESISTANT COATING OF BARIUM TITANATE

[72] Inventors: Ronald A. Dork, Utica; Ronald E. White, Romeo, both of Mich.

[73] Assignee: General Motors Corporation, Detroit, Mich.

[22] Filed: Sept. 2, 1969

[21] Appl. No.: 854,528

[52] U.S. Cl. ................117/138.8UA, 117/138.8 F, 117/169
[51] Int. Cl. ........................................B32b 27/06, B44d 5/00
[58] Field of Search.....................117/138.8 UA, 169, 106

[56] References Cited

UNITED STATES PATENTS

| | | |
|---|---|---|
| 2,426,609 | 9/1947 | Hodgdon ..........................117/138.8 U |
| 3,002,861 | 10/1961 | Suchoff..................................117/169 |
| 3,404,996 | 10/1968 | Deichert et al. ................117/138.8 U |
| 3,421,928 | 1/1969 | Ramsey et al....................117/138.8 U |
| 3,368,920 | 2/1968 | Hagenlocher..........................117/106 |

FOREIGN PATENTS OR APPLICATIONS 502,978    1939    Great Britain .....................117/106 R

OTHER PUBLICATIONS

Powell et al., Vapor Deposition, Wiley & Sons, Inc., N.Y., 1966, pp. 30,31.

*Primary Examiner*—William D. Martin
*Assistant Examiner*—Sadie L. Childs
*Attorney*—William S. Pettigrew, Peter P. Kozak and George A. Grove

[57] ABSTRACT

A composite optical element is disclosed having a synthetic resin substrate and an abrasion resistant surface coating of barium titanate. A polycarbonate resin substrate and an R.F. vacuum sputtered barium titanate protective surface coating provides a particularly tough and abrasion resistant optical element such as a window or windshield.

3 Claims, 1 Drawing Figure

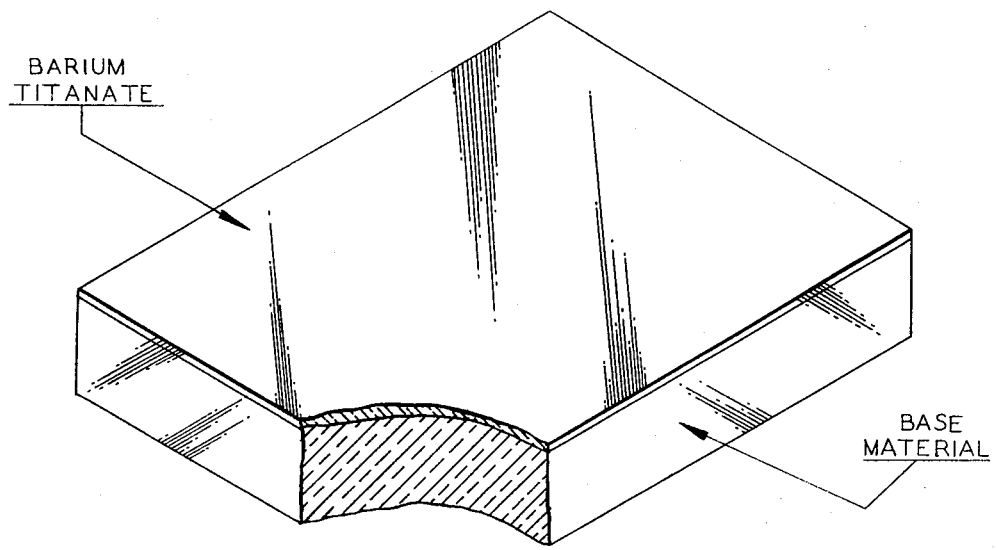

TRANSPARENT PLASTIC HAVING TRANSPARENT MAR-RESISTANT COATING OF BARIUM TITANATE

This invention relates to composite optical members formed of tough plastic substrates and abrasion resistant surface coatings. More particularly, this invention relates to the coating of optically clear, impact-resistant synthetic resins with a film of optically clear, abrasion-resistant barium titanate.

Plastic materials are considered for use in optical elements because of their toughness, optical clarity, and durability. However, particularly suitable synthetic resins, such as polycarbonates and polymethylmethacrylates, are soft and quite susceptible to abrasion which mars the surface and significantly reduces light transmittance. A number of different types of coatings have been proposed for application to the plastic surfaces, these coatings being optically clear and abrasion-resistant. Some of these materials are organic in nature, such as polyester resins. The polyester coatings provide some increase in abrasion resistance but further improvement is desired. The prior art has also taught the use of the silica or other glass-like coatings on the surface of polycarbonate or polymethylmethacrylate resins. These coatings, however, are susceptible to many of the drawbacks of glass optical elements.

It is an object of the present invention to provide a composite optical element combining the toughness and durability of a suitable plastic, such as a polycarbonate resin, and the abrasion resistance of a film of barium titanate.

It is another object of the present invention to provide a composite optical element comprising a tough optically clear plastic substrate and a thin abrasion-resistant surface coating of R.F. sputtered barium titanate.

In accordance with a preferred embodiment of our invention, these and other objects are accomplished by forming a suitable plastic, such as polycarbonate or polymethylmethacrylate, into the shape of a desired optical element. For example, the resin may be molded in sheet form so as to serve as a windshield, a window, or an instrument cover lens. In these applications, usually one or both of the major flat surfaces of the optical element are subject to an abrasive environment. In accordance with our invention, such a surface is coated with a thin film, preferably about 0.4 mils to 3 mils in thickness, of barium titanate ($BaTiO_3$). The barium titanate film is readily applied by means of known R.F. vacuum sputtering techniques. Thus, as is illustrated in the drawing, in general our composite optical element comprises a substrate or base material of suitable synthetic resin and an abrasion-resistant surface film of barium titanate. We have found that a thin film of barium titanate provides excellent abrasion resistance. It is relatively easy to apply to synthetic resins and is compatible with these materials. Moreover, barium titanate has optical properties highly suitable for use in optical elements.

These and other objects and advantages of our invention will be more clearly understood from a detailed description thereof in terms of a specific embodiment.

A transparent circular sheet 4 inches in diameter and about one-eighth inch in thickness was molded from a polycarbonate resin. Polycarbonate resins are readily available from a number of commercial sources and are typically tough, impact-resistant materials of sufficient optical clarity for use in windshields and the like. Their principal shortcoming in such applications is their tendency to scratch or abrade. To one surface of this circular sheet of polycarbonate resin was applied a thin film of barium titanate, approximately 1 mil (0.001 inch) in thickness, by means of a radio frequency vacuum sputtering technique. R.F. sputtering techniques have been known for some time and have been utilized in many different applications. An excellent summary of such processes is found in the article "R-F Sputtering Processes" by J. L. Vossen and J. J. O'Neill, Jr., RCA Review, pp. 149–179, June 1968. Our barium titanate film was applied to the polycarbonate resin sheet in accordance with the general process techniques outlined in the above review article.

Our sputtering apparatus was of conventional design. We employed a triode system in which a low energy plasma was formed by thermionic electrons colliding with argon gas molecules as the electrons fell through a potential of fifty to seventy volts D.C. In our arrangement the target material, a 4-inch disk of pressed and sintered barium titanate grains, was made a third electrode acting like a shielded, nonconducting grid inserted into the argon plasma. A radio frequency (8 MHz.) voltage was impressed upon the grid and as each R.F. cycle switched polarity, electrons or ions were forced to bombard the barium titanate target material. The bombardment of the target material resulted in barium titanate molecules being dislodged and subsequently deposited on the molded sheet of polycarbonate resin spaced about 2½ inch from the barium titanate target and parallel thereto.

The R.F. sputtering chamber was maintained at a reduced pressure of about $10^{-3}$ to $10^{-4}$ torr. As indicated above, the principal source of this pressure was low density argon gas, and plasma. For our application involving the coating of a synthetic resin substrate, the sputtering was done at relatively low sputtering rates at an R.F. voltage of 1,000 volts, peak to peak. It is preferred that an R.F. voltage of no greater than 1,000 volts be employed so that ambient temperatures in the sputtering chamber do not exceed the melting point of the plastic. In our sputtering operations the plastic materials to be coated were supported on a water-cooled substrate holder so that temperature of the plastic was maintained well below its glass transition temperature and melting point. This provided for a stronger stress-free bond between the barium titanate film and the plastic substrate. When a film of barium titanate had been built up to a thickness of about 1 mil, the sputtering was discontinued and the coated plastic sheet removed from the sputtering chamber for evaluation.

A number of polycarbonate sheets were coated with R.F. sputtered barium titanate in accordance with the above procedure and these materials were compared with the number of specimens of uncoated commercially available polycarbonates and with a number of commercially available organic coated polycarbonates. The specimens were all tested, using a Taber Abraser. In the operation of this device, 4-inch specimens were positioned on a flat rotatable wheel or turntable and two smaller rotating abrasive wheels were brought down into contact with the surface of the plastic specimen. Upon rotation of the supporting wheel, the two abrasive wheels were caused to roll against the specimen, tending to scratch it. A 1,000-gram load was placed on each abrasive wheel. Each specimen tested was rotated 100 times under the abrasion wheels. Thereafter its light transmittance was measured with a Cary 15 spectrophotometer. Based on the degree of loss of transmittance after abrasion due to a scratched surface, the specimens were given a rating of 1 to 10, the higher values reflecting greater light transmittance and better abrasion resistance. The average values of the tested specimens are tabulated below:

| Specimen | Rating |
| --- | --- |
| Commercial Polycarbonate No. 1 (uncoated) | 0.7 |
| Commercial Polycarbonate No. 2 (uncoated) | 2.7 |
| Commercial Organic Coated Polycarbonate No. 1 | 4.4 |
| Commercial Organic Coated Polycarbonate No. 2 | 7.3 |
| Commercial Polycarbonate-Barium Titanate coated | 8.0 |

It is seen that our barium titanate coated polycarbonate specimens retained greater light transmittance after testing and were therefore more abrasion-resistant than either the other coated polycarbonates or the uncoated polycarbonates. Moreover, we found that the barium titanate films were strongly adherent to synthetic resin substrates and were otherwise entirely suitable for use in optical devices.

In addition to composite optical elements formed of polycarbonate resins and barium titanate films, composites may also be formed of other synthetic resins. Polymethylmethacrylates are tough and optically clear materials which also may be employed. Other soft but tough plastics may also be substituted for the polycarbonate resins. We prefer that the thickness of the R.F. sputtered barium titanate film be in the range of about 0.4 mils to 3 mils. Films of this thickness are tenacious, durable, and abrasion-resistant and optically clear. Increased thicknesses contribute little if anything to the abrasion resistance of the composite.

While our invention has been described in terms of a few specific embodiments thereof, it will be appreciated that other forms thereof can be adapted by one skilled in the art and, therefore, the scope of the art is not necessarily limited by the examples of the disclosure.

We claim:

1. A composite optical element having a surface resistant to mechanical scratching, comprising a substrate of transparent synthetic resin taken from the group consisting of polymethylmethacrylate and polycarbonate, and a thin transparent scratch resistant surface layer of radio frequency vacuum sputtered barium titanate superimposed thereon, the thickness of said surface layer being about 0.4 to 3 mils.

2. A composite window comprising a substrate in sheet form of transparent polycarbonate resin having superimposed on at least one surface thereof a thin, transparent adherent layer of radio frequency vacuum sputtered barium titanate, the thickness of said layer being about 0.4 to 3 mils.

3. A composite window comprising a substrate in sheet form of transparent synthetic resin taken from the group consisting of polymethylmethacrylate and polycarbonate having superimposed on at least one surface thereof a thin transparent adherent layer of radio frequency vacuum sputtered barium titanate, the thickness of said layer being about 0.4 to 3 mils.

* * * * *